(12) United States Patent
Sakanaba

(10) Patent No.: US 9,549,122 B2
(45) Date of Patent: Jan. 17, 2017

(54) IMAGING APPARATUS, PHOTOGRAPHING GUIDE DISPLAYING METHOD FOR IMAGING APPARATUS, AND NON-TRANSITORY COMPUTER READABLE MEDIUM

(75) Inventor: Takayuki Sakanaba, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 638 days.

(21) Appl. No.: 13/984,965

(22) PCT Filed: Feb. 21, 2012

(86) PCT No.: PCT/JP2012/001137
§ 371 (c)(1),
(2), (4) Date: Aug. 12, 2013

(87) PCT Pub. No.: WO2012/132204
PCT Pub. Date: Oct. 4, 2012

(65) Prior Publication Data
US 2013/0314493 A1 Nov. 28, 2013

(30) Foreign Application Priority Data
Mar. 30, 2011 (JP) .................... 2011-074320

(51) Int. Cl.
*H04N 15/00* (2006.01)
*H04N 13/00* (2006.01)
(Continued)

(52) U.S. Cl.
CPC .......... *H04N 5/23238* (2013.01); *G03B 17/18* (2013.01); *G03B 35/02* (2013.01);
(Continued)

(58) Field of Classification Search
CPC ............ H04N 5/23238; H04N 13/0207; H04N 5/23293; H04N 13/0296; G03B 17/18; G03B 35/02; G03B 37/02
See application file for complete search history.

(56) References Cited

U.S. PATENT DOCUMENTS 6,181,653 B1 * 1/2001 Wada .................... G11B 15/18
369/47.33
2004/0189849 A1 9/2004 Hofer
(Continued)

FOREIGN PATENT DOCUMENTS

EP 2018049 A2 1/2009
JP 2000-262478 A 9/2000
(Continued)

OTHER PUBLICATIONS

Communication dated Jul. 25, 2014 from the European Patent Office in counterpart European Patent Application No. 12762927.7.
(Continued)

*Primary Examiner* — Sath V Perungavoor
*Assistant Examiner* — Xiaolan Xu
(74) *Attorney, Agent, or Firm* — Sughrue Mion, PLLC

(57) ABSTRACT

A digital camera includes an image sensor unit, a display that displays an image photographed by the image sensor unit, and a photographing guide generating unit that displays a photographing guide on the display when the image sensor unit obtains a stereo image or a panoramic image. The photographing guide generating unit displays, on the display as the photographing guide, an aiming mark that displays a fixed point positioned substantially at the center of the display and a guide mark that is a fixed point in the image photographed by the image sensor unit and has a length necessary for the stereo image or the panoramic image in a moving direction of the digital camera on a screen. Then, it (Continued)

is possible to provide an imaging apparatus capable of stably moving the imaging apparatus upon photographing a panoramic picture.

5 Claims, 8 Drawing Sheets

(51) Int. Cl.
*H04N 5/232* (2006.01)
*H04N 13/02* (2006.01)
*G03B 17/18* (2006.01)
*G03B 35/02* (2006.01)
*G03B 37/02* (2006.01)

(52) U.S. Cl.
CPC ......... *G03B 37/02* (2013.01); *H04N 5/23293* (2013.01); *H04N 13/0207* (2013.01); *H04N 13/0296* (2013.01)

(56) References Cited

U.S. PATENT DOCUMENTS

2009/0021576 A1* 1/2009 Linder .................. G03B 37/00
348/36
2011/0025829 A1 2/2011 McNamer et al.
2011/0058015 A1* 3/2011 Moriyama ............. G03B 17/18
348/36

FOREIGN PATENT DOCUMENTS

| JP | 2004-304801 A | 10/2004 | |
|---|---|---|---|
| JP | 2005-223905 A | 8/2005 | |
| JP | 2008-289095 A | 11/2008 | |
| JP | 2009-060278 A | 3/2009 | |
| JP | 2009-278432 A | 11/2009 | |
| JP | WO 2009142327 A1 * | 11/2009 | ............. G03B 17/18 |
| WO | 2009/142327 A1 | 11/2009 | |

OTHER PUBLICATIONS

Communication dated Dec. 6, 2016, issue by the Japan Patent Office in corresponding Japanese Application No. 2013-507094.

* cited by examiner

IMAGING APPARATUS, PHOTOGRAPHING GUIDE DISPLAYING METHOD FOR IMAGING APPARATUS, AND NON-TRANSITORY COMPUTER READABLE MEDIUM

CROSS REFERENCE TO RELATED APPLICATIONS

This application is a National Stage of International Application No. PCT/JP2012/001137 filed Feb. 21, 2012, claiming priority based on Japanese Patent Application No. 2011-074320 filed Mar. 30, 2011, the contents of all of which are incorporated herein by reference in their entirety.

TECHNICAL FIELD

The present invention relates to an imaging apparatus including a camera function such as a digital camera, a photographing guide displaying method for the imaging apparatus, and a non-transitory computer readable medium, and particularly to an imaging apparatus attempting to improve user operability, a photographing guide displaying method for the imaging apparatus, and a non-transitory computer readable medium.

BACKGROUND ART

In existing imaging apparatuses such as digital cameras, there is a method of horizontally sliding the camera with respect to a subject to be photographed (subject) and photographing a panoramic or 3D (stereo) picture. In this photographing method, usually a few pictures are photographed automatically or manually during the slide. In general, a desired image is obtained by, in the case of a panoramic picture, stitching the photographed pictures in the slide direction, or in the case of a 3D (stereo) picture, extracting appropriate two pictures or generating a 3D picture based on the photographed pictures. Since such a generation method is well known, the details will not be provided here.

Such photographing is explained. FIGS. 7A to 7E show examples of panoramic photographing using an imaging apparatus of a related art. As shown in FIG. 7A, several images are photographed while sliding the camera horizontally, and photographed images 71 to 74 are stitched thereby to generate one panoramic picture as shown in FIG. 7B. Moreover, as shown in FIG. 7C, in a similar manner, several pictures are photographed during the slide to photograph images 75 to 80. Then, as shown in FIGS. 7D and 7E, a 3D (stereo) picture may be created by generating two pictures with disparities based on information of the images 75 to 80.

In both cases of photography, in order to generate a rectangular picture based on the photographed several pictures, it is necessary to detect correlated portions in the photographed several pictures and use the correlated portions as overlapping portions upon combining pictures. However, the camera may shake in the up-and-down direction and rotation direction with respect to the subject because the pictures are photographed while sliding the camera horizontally. The greater the camera shakes, the lower the correlation between the photographed several pictures, specifically, the overlapping portions will be smaller, thereby influencing quality and size of a resultant picture.

An example of the influence generated by the camera shake is explained. FIGS. 8A to 8D explain the camera shakes. FIGS. 8A to 8D explain the camera shakes using panoramic photographing as an example. As shown in FIGS. 8A to 8D, in this example, one panoramic picture is obtained from four pictures. FIG. 8A shows pictures with small camera shakes, while FIG. 8C shows an example with large camera shakes. In the pictures shown in FIG. 8A, images 81 to 84 have strong correlations between the photographed several pictures as the camera shakes in the up-and-down direction with respect to the subject are small, and consequently, it is possible to extract a panoramic picture with the size in the up-and-down direction (vertical direction of the screen) mostly remaining the same, as shown in FIG. 8B.

On the other hand, in the pictures shown in FIG. 8C, images 85 to 88 have weak correlations between the photographed several pictures as the camera shakes in the up-and-down direction with respect to the subject are large. Thus as shown in FIG. 8D, only a panoramic picture with a small size in the up-and-down direction (vertical direction of the screen) can be extracted with less amount of information and more deteriorated photograph quality than the panoramic picture of FIG. 8B.

In FIGS. 8A to 8D, the panoramic photographing is used as an example, however also in 3D (stereo) photographing in which the camera horizontally slides to photograph images, the correlations between several pictures photographed in a similar manner are greatly associated with quality of a final picture obtained eventually.

Therefore, some imaging apparatuses of related arts display a photographing guide to guide a user upon photographing an image. For example, patent literature 1 discloses a method of photographing several pictures while sliding the camera and stitching the pictures to obtain a panoramic picture. Patent literature 1 also suggests a function of drawing, on a screen, a vertical line for guide as an indication of a composite point to be combined with a previously photographed image. Patent literature 2 discloses a similar technique as well. However, there is a problem in these methods in which a photographer is forced to compare a shape of a subject in order to prevent displacement between the previously photographed picture and a picture to be photographed, and it is thus difficult to photograph the image without displacement depending on the subject.

Further, the technique disclosed in patent literature 3 displays, after a first picture is photographed, a pointer as a movement mark that moves according to an amount of image movement determined as a result of motion detection processing performed by a motion detection unit and a target as a movement target mark indicating a movement target position for the pointer. Specifically, a next photographing position is determined such that a predetermined range of partial images overlaps. Patent literature 3 discloses a technique of setting the pointer and the movement target position (target position) of the pointer according to the next photographing position and placing the pointer and the target over a live view image to move the pointer over the target, thereby promoting a panning operation.

Furthermore, patent literature 4 discloses a technique of displaying a pair of guide marks, which is composed of a movement mark indicating a relative position of a camera to a subject and a goal mark indicating a target position for the movement mark to move and reach. Then, a target mark Tm of the guide marks is an index and the movement mark that moves on a monitor screen of a display along with a movement of a camera by a user and indicates a relative position of a camera 1 to the subject. A goal mark Gm is a target position to which the user moves and lets the target mark Tm (movement mark) reach by moving the camera on the monitor screen of the display and is an appropriate position for photographing a panoramic picture. These displayed marks are guides for the user.

CITATION LIST

Patent Literature

Patent literature 1: Japanese Unexamined Patent Application Publication No. 2005-223905
Patent literature 2: Japanese Unexamined Patent Application Publication No. 2004-304801
Patent literature 3: Japanese Unexamined Patent Application Publication No. 2009-278432
Patent literature 4: Japanese Unexamined Patent Application Publication No. 2009-60278

SUMMARY OF INVENTION

Technical Problem

However, as both photographing guides disclosed in patent literatures 3 and 4 are shown as dots on the screen, the user is required to operate the camera with the dots as target guides, thus leading to a problem that it is difficult to control movement of the camera when a distance to the photographing guide is long, for example.

The present invention is made to solve such a problem and an object is to provide an imaging apparatus capable of stably moving the imaging apparatus upon photographing a panoramic picture and the like using the imaging apparatus, a photographing guide displaying method for the imaging apparatus, and a non-transitory computer readable medium.

Solution to Problem

An imaging apparatus according to the present invention includes imaging means, display means for displaying an image photographed by the imaging means, and photographing guide generating means for displaying a photographing guide on the display means when the imaging means obtains a stereo image or a panoramic image. The photographing guide generating means displays, on the display means as the photographing guide, an aiming mark that marks a fixed point positioned substantially at a center of the display means and a guide mark that is a fixed position in the image imaged by the imaging means and has a length necessary for the stereo image or the panoramic image in a moving direction of the imaging apparatus on a screen.

A photographing guide displaying method for an imaging apparatus according to the present invention is a photographing guide displaying method that displays a photographing guide on display means for displaying a photographed image when a stereo image or a panoramic image is obtained by imaging means. The photographing guide displaying method includes displaying an aiming mark and a guide mark on the display means as the photographing guide, in which the aiming mark marks a fixed point positioned substantially at a center of the display means, and a guide mark is a fixed position in the image imaged by the imaging means and has a length necessary for the stereo image or the panoramic image in a moving direction of the imaging apparatus on a screen.

Further, a non-transitory computer readable medium according to the present invention stores a program to cause a computer to execute a photographing guide display process for the above-mentioned imaging apparatus.

Advantageous Effects of Invention

According to the present invention, it is possible to provide the imaging apparatus capable of stably moving the imaging apparatus upon photographing a panoramic picture and the like using the imaging apparatus, the photographing guide displaying method for the imaging apparatus, and the non-transitory computer readable medium.

DESCRIPTION OF EMBODIMENTS

Hereinafter, a specific exemplary embodiment incorporating the present invention is explained in detail with reference to the drawings. This exemplary embodiment is an application of the present invention to a digital camera that photographs stereo or panoramic images.

In this exemplary embodiment, a photographing guide composed of a guide mark and an aiming mark is displayed on a display of an imaging apparatus such as a digital camera, the aiming mark is focused on the guide mark extending in the slide direction (moving direction) on the screen, and images are photographed while sliding the digital camera such that the aiming mark will not be displaced from the guide mark, thereby facilitating image photographed during the slide. Note that as for a technique of combining photographed images to generate a panoramic picture or a 3D (stereo) image, a common automatic composite function used in the existing digital cameras can be used.

That is, the digital camera according to this exemplary embodiment includes a guide function to reduce photographing errors especially upon photographing images while moving the apparatus. Although the digital camera is used to explain this exemplary embodiment, it is obvious that the present invention can be applied to any other imaging apparatuses including a camera such as a cellular phone with a digital camera and a digital video camera.

Figure 1:
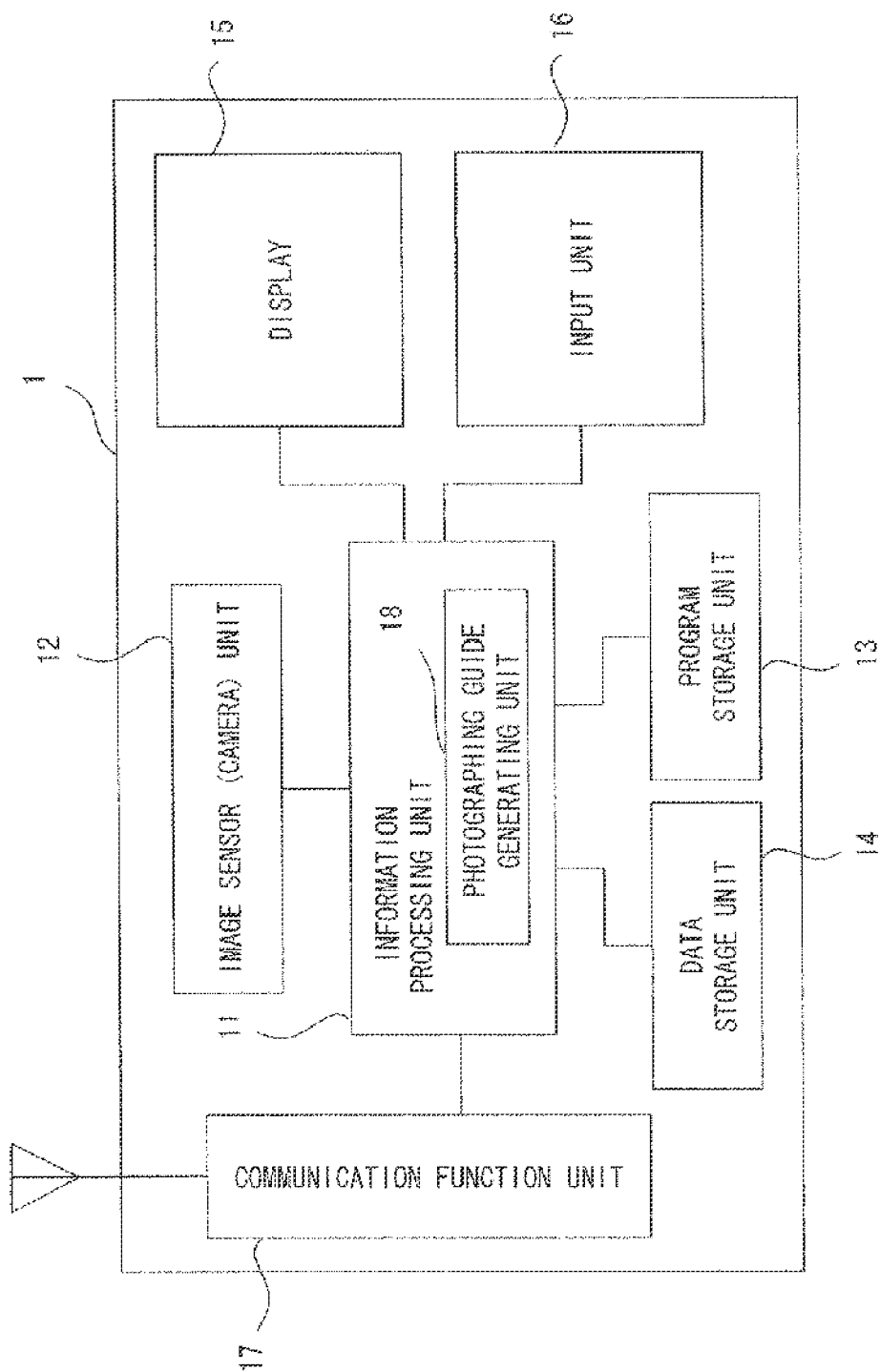
FIG. 1 is a block diagram showing a digital camera according to an exemplary embodiment of the present invention.

FIG. 1 is a block diagram showing the digital camera according to this exemplary embodiment of the present invention. As shown in FIG. 1, a digital camera 1 includes an information processing unit 11, an image sensor (camera) unit 12, a program storage unit 13, a data storage unit 14, a display 15, an input unit 16, and a communication function unit 17.

The information processing unit 11 is a unit that plays a role of the brain in the digital camera 1. The information processing unit 11 includes an electronic computer for information processing and a memory for temporally storing information used in calculation. Moreover, the information processing unit 11 includes a photographing guide generating unit 18 that performs processing to display the photographing guide on the display 15 when the image sensor unit 12, which is an imaging unit, photographs a stereo or panoramic image. In an attempt to prevent the above-mentioned deterioration in the photograph quality, the photographing guide generating unit 18 displays, to the user, the photographing guide for operations of the digital camera 1 upon sliding the digital camera 1 to photograph images, so as to suppress the shakes in the digital camera 1. The photographing guide generating unit 18 displays, on the display 15 as the photographing guide, the aiming mark displaying a fixed point positioned substantially at the center of the display 15 and the guide mark that is a fixed position on the image photographed by the image sensor unit 12 and has a length necessary for a stereo or panoramic image in the movement of the imaging apparatus on the screen. The details of the photographing guide are explained later.

The image sensor unit 12 provides a camera function including an electronic image sensor and a lens. A digital picture photographed by the image sensor unit 12 in response to an instruction from the information processing unit 11 is transmitted to the information processing unit 11.

The program storage unit 13 stores processing means of the information processing unit 11. The information processing unit 11 reads procedures from the program storage unit 13 and operates.

The data storage unit 14 stores the photographed digital images or operation results of the digital camera 1 that are transmitted from the information processing unit 11. Conversely, the data storage unit 14 provides the stored data to the information processing unit 11 in response to a read instruction from the information processing unit 11.

The display 15 includes a display device and displays data such as the digital pictures, texts, and graphics that are transmitted from the information processing unit 11. The input unit 16 includes buttons such as a shutter button, a dial, and a touch panel and receives instructions issued by user operations.

The communication function unit 17 accesses a wireless NW enable voice calls, data communications and the like, which is a function included in common cellular phones. Note that this function may not be included in the digital camera depending on the model. In this exemplary embodiment, in an attempt to prevent the above-mentioned deterioration in the photograph quality, the photographing guide for operations is displayed to the user upon sliding the digital camera 1 to photograph images so as to suppress the shakes in the digital camera 1.

Figure 2:
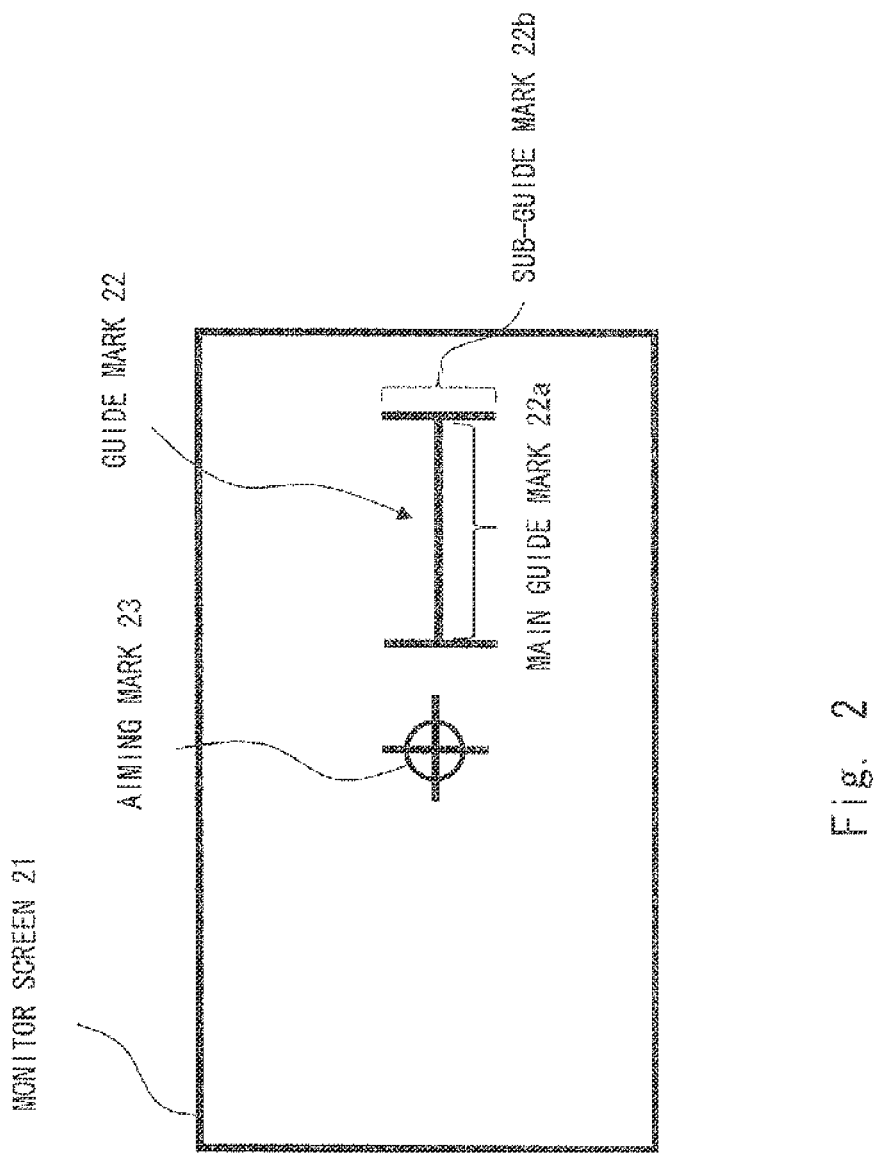
FIG. 2 is a diagram showing a display example of a photographing guide.

FIG. 2 is a diagram showing a display example of the photographing guide. A monitor screen 21 is a display including a viewfinder function corresponding to the display 15 in FIG. 1. A subject photographed by the digital camera 1 is displayed real-time on the monitor screen 21 together with a guide mark 22 and an aiming mark 23, which are described later, that are displayed overlapping the subject. Note that common digital cameras of recent days display configuration information such as a remaining battery level and various statuses, however the explanation thereof is not provided here as it is an existing technique and outside the scope of the present invention.

The guide mark 22 is a photographing guide display drawn overlapping the subject image displayed on the monitor screen 21. This guide mark 22 is drawn at the center of the subject (the range to be photographed) as a fixed point of the subject. Moreover, the guide mark 22 is composed of a main guide mark 22a and a sub-guide mark 22b and forms an H shape. Here, the width of the main guide mark 22a indicates a range for the digital camera 1 to slide.

The aiming mark 23 is a photographing guide displayed overlapping the subject image displayed on the monitoring screen 21. The above-mentioned guide mark 22 indicates the fixed point of the subject, while this aiming mark 23 displays a fixed point on the monitor screen 21 (on the viewfinder) and indicates a central position between top and bottom of the monitor screen 21. It should be noted here that the aiming mark 23 is not a fixed point at the center between the top and bottom of the physical monitor screen 21 (on the viewfinder) but the center between the top and bottom of the range to be a picture of the subject image that is displayed on the monitor screen 21 (on the viewfinder). Note that a display on a monitor screen with 100% field of view corresponds to a range to be a picture.

Here, the sub-guide mark 22b is lines displayed at both ends of the main guide mark 22a in the direction orthogonal to the main guide mark 22a. The width of the sub-guide mark 22b indicates an acceptable range of a displacement width of the aiming mark 23. Note that the guide mark may be composed only of the main guide mark 22a, however including the sub-guide mark 22b further facilitates camera operations by the user.

As these items are displayed on the monitor screen to be the viewfinder, when the digital camera 1 horizontally slides and photographs images, it is possible to facilitate visual detection of the shakes in the digital camera 1 in the up-and-down direction by moving the digital camera 1 such that the aiming mark 23 traces the guide mark 22 sliding on the screen following the subject displayed and updated real-time.

On the contrary, in order to prevent the shakes in the digital camera 1 during the slide, the digital camera 1 may slide such that the aiming mark 23 traces the guide mark 22. This is an effective measure for preventing the camera shakes. Additionally, when the horizontal length of the guide mark 22 is set to the range that can be photographed during the slide, there is another exemplary advantage that visually shows the range that can be photographed during the slide.

Figure 3:
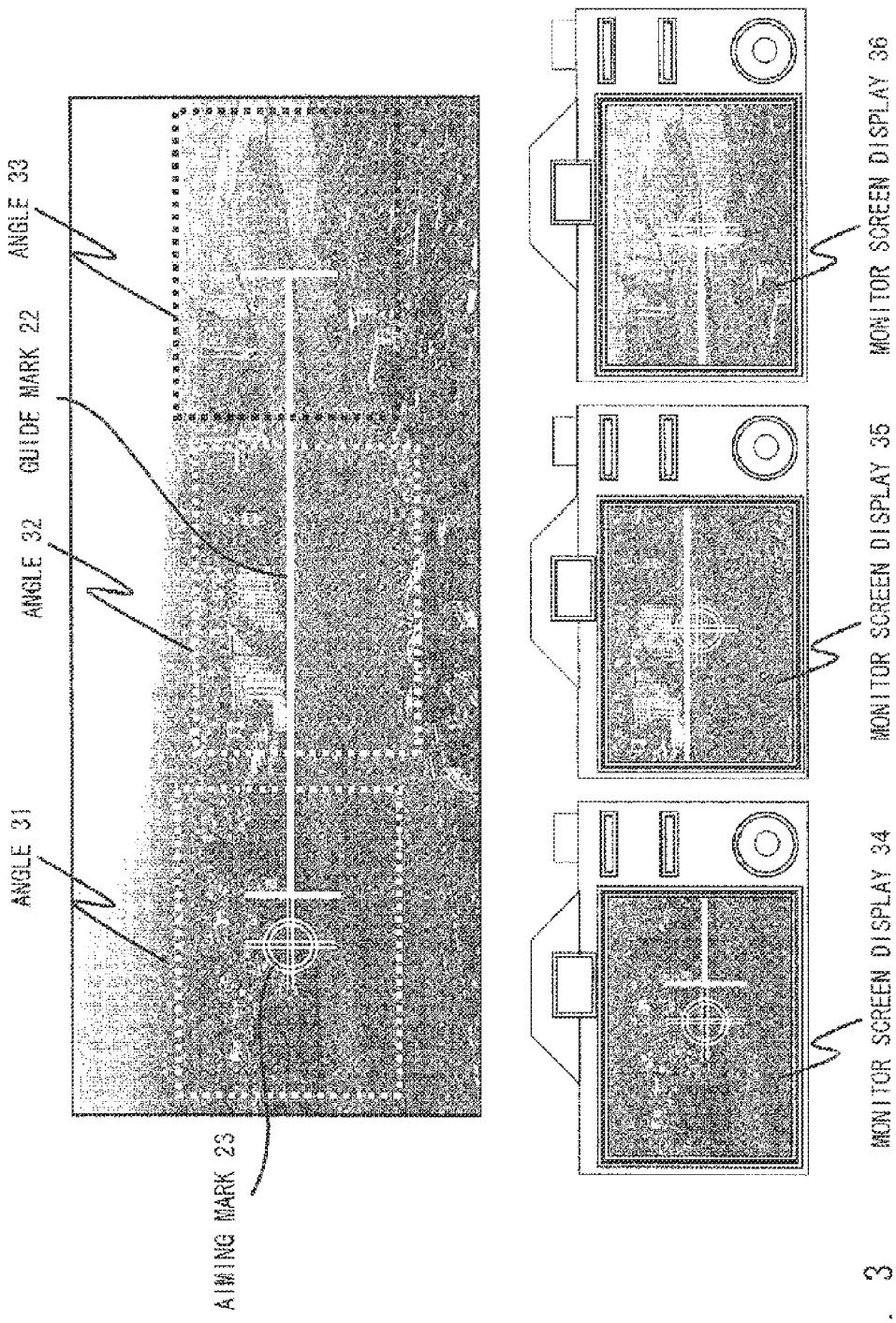
FIG. 3 is a diagram showing a usage example of the photographing guide upon photographing a panoramic picture while sliding a digital camera 1 according to the exemplary embodiment of the present invention.

Next, an operation method of the photographing guide shown in FIG. 2 is explained using FIG. 3. FIG. 3 shows, in the case when the digital camera 1 horizontally slides and photographs a panoramic picture, specific contract between angles indicating ranges to be photographed (to be pictures) on the subject and the displays on the monitor screen of the digital camera 1 upon photographing the angles. Note that for the sake of convenience, FIG. 3 clearly shows the photographing guide displays and the ranges (dashed-line areas) to be cut as pictures on the digital camera 1.

An angle 31 is an example upon starting the slide. The display on the monitoring screen 21 of the digital camera 1 corresponding to the angle 31 is also shown as a monitor screen display 34. In this case, there is no shake yet in the digital camera 1, and the vertical positions of the guide mark 22 and the aiming mark 23 are the same.

From this state, several pictures are photographed while horizontally sliding the digital camera 1 in the right direction. An angle 32 is an example of an intermediate picture. Moreover, the display on the monitor screen 21 in this case is shown as a monitor screen display 35. Note that the angle 32 is an example of a case when the digital camera 1 shakes slightly downward.

The guide mark 22 is still the fixed point of the subject and the aiming mark 23 is the fixed point on the monitor screen 21 (on the viewfinder). Thus in this case, the screen displayed on the monitor screen 21 is relatively offset upward, thereby displacing the vertical positions of the guide mark 22 and the aiming mark 23. This displacement is visualization of the shake in the digital camera 1, which provides the user with apparent recognition that the user needs to correct the orientation of the digital camera 1 upward so as to photograph a picture with high quality.

An angle 33 is an assumed end of photographing. The monitoring screen corresponding to the angle 33 is a monitor screen display 36. In this case, the guide mark 22 indicates an end point and provides visualization that the photographing ends when the aiming mark 23 exceeds the guide mark 22.

Figure 4:
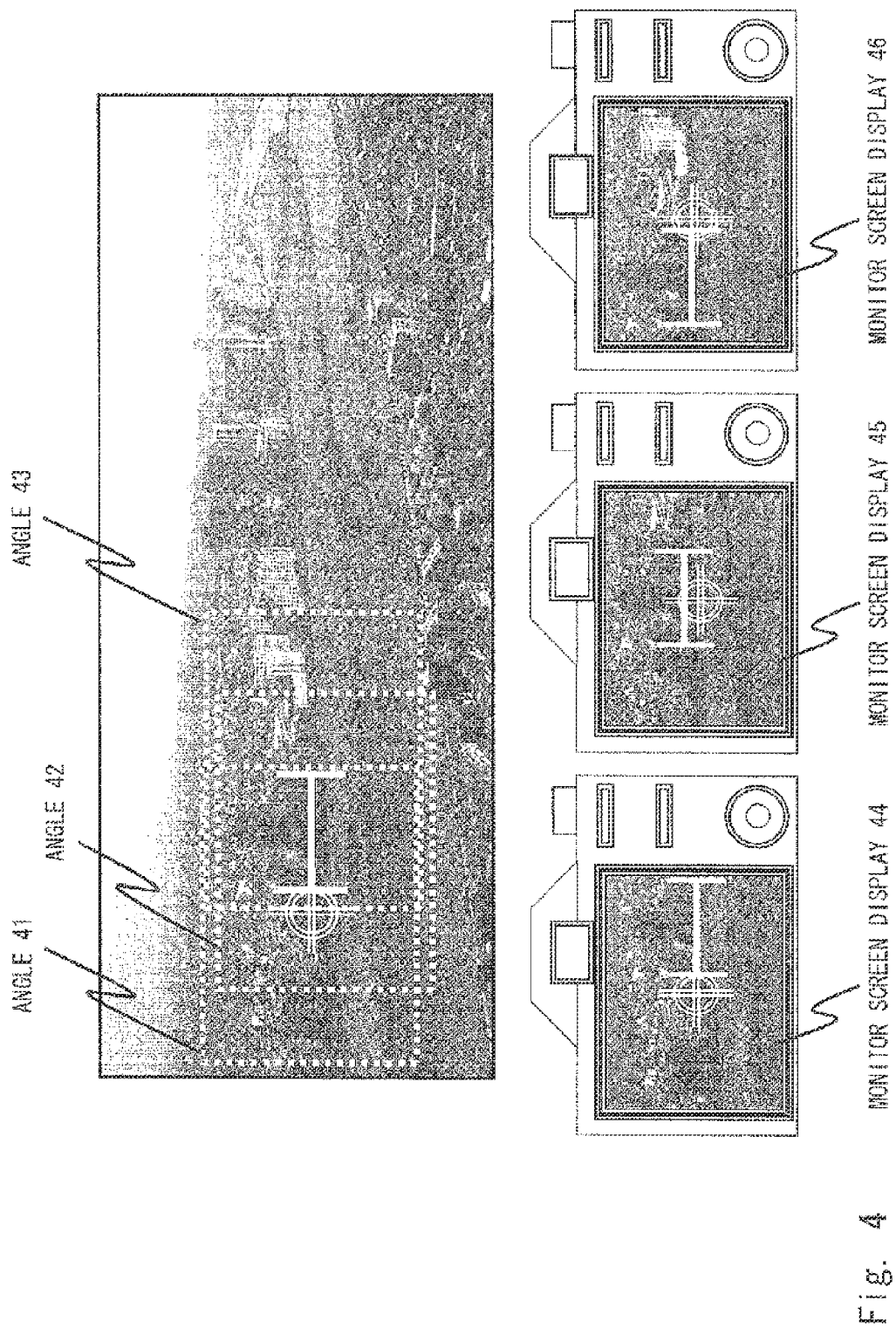
FIG. 4 is a diagram showing a usage example of the photographing guide upon photographing a 3D (stereo) picture while sliding the digital camera 1 according to the exemplary embodiment of the present invention.

Moreover, FIG. 4 is a diagram showing a usage example of the photographing guide upon photographing a 3D (stereo) picture while sliding the digital camera 1 according to this exemplary embodiment.

Although the method of photographing images while sliding the digital camera 1 is same as the panoramic photographing explained using FIG. 3, a difference from the panoramic photographing is that the guide mark 22 indicates a photographing range (the range in which the camera slides) to obtain disparities for 2D. Other differences are that an angle 41 corresponds to a monitor screen 44, an angle 42 corresponds to a monitor screen 45, and an angle 43 corresponds to a monitor screen 45. Further, the angle 42 is an example of a downward shake in the digital camera 1, which is the same as the circumstance explained for the angle 32 of FIG. 3.

Figure 5:
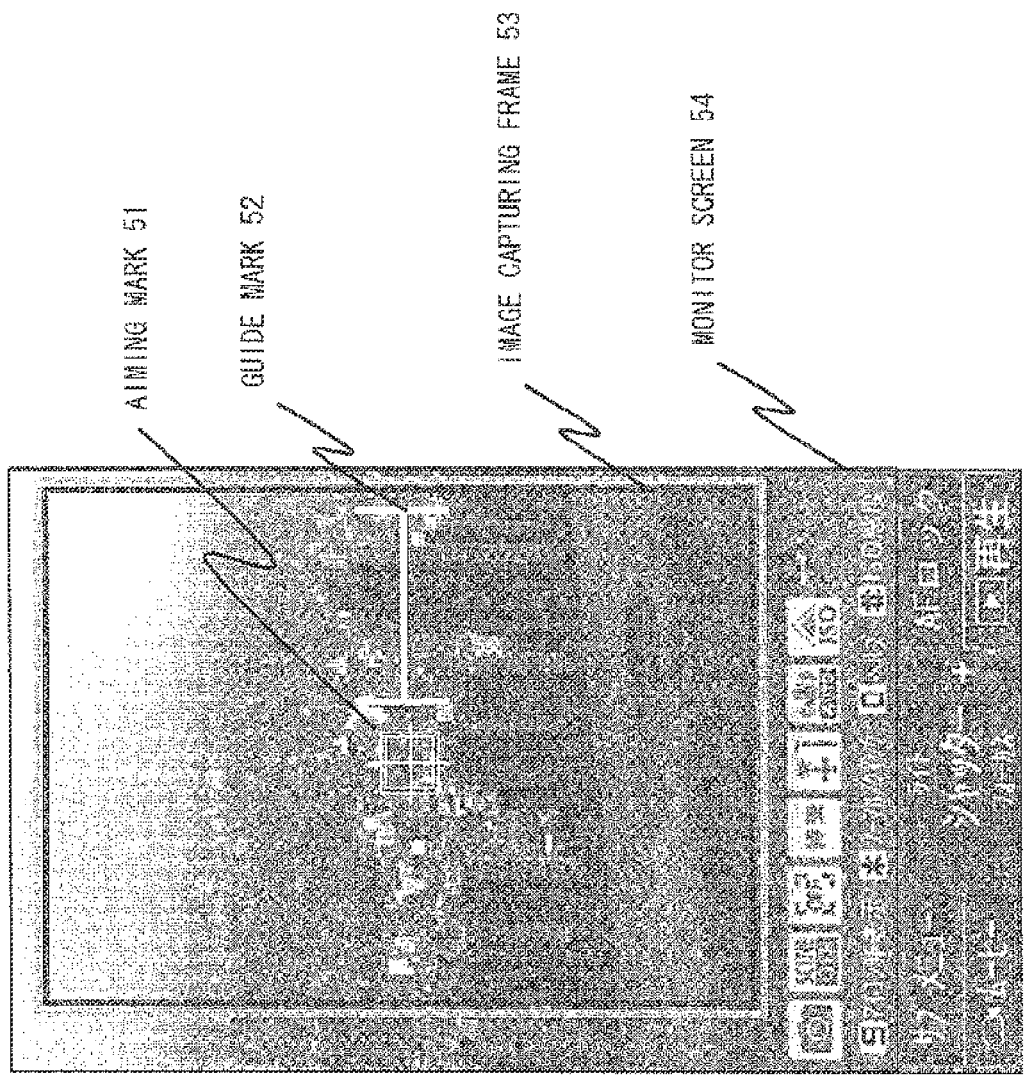
FIG. 5 is a diagram showing a modification of the exemplary embodiment of the present invention and showing a usage example by a cellular phone.

Note that an operation method of the digital camera is explained as this exemplary embodiment, it is obvious that the present invention can be used to other devices with a camera function such as a cellular phone. FIG. 5 is a diagram showing a specific application to the camera function of the cellular phone. In this case, a guide mark 52 corresponds to the guide mark 22 shown in FIG. 2, and an aiming mark 51 corresponds to the aiming mark 23 shown in FIG. 2. Since a monitor screen 54 shows the range more than a photograph viewing angle (photograph viewing angle is exceeding 100%), a photographing frame 53 indicates a range to be photographed as a picture. Therefore, as mentioned above, the aiming mark 51 is positioned at the center in the up-and-down direction of the photographing frame 53 (the range photographed as a picture) and not at the center in the up-and-down direction of the monitor screen 54.

Figure 6:
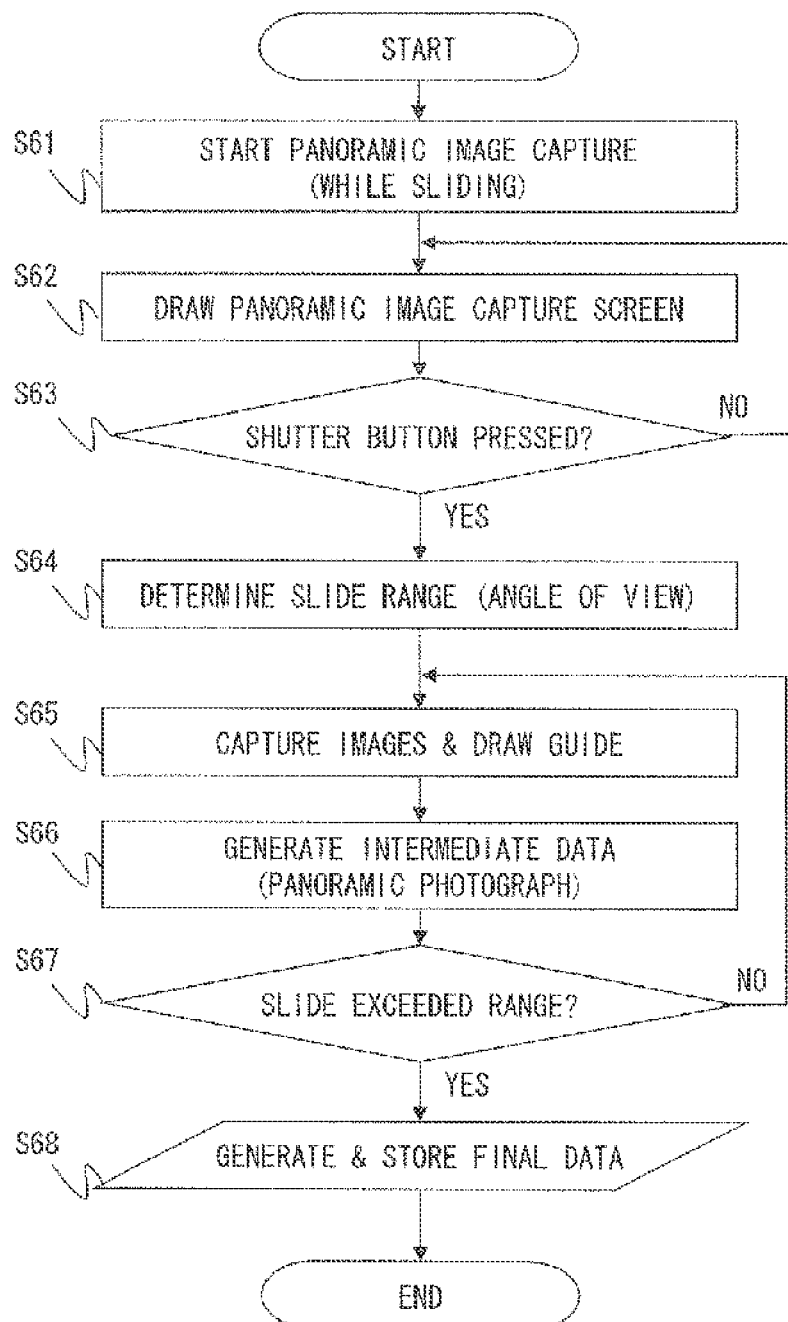
FIG. 6 is a flowchart showing an operation of the digital camera 1 according to the exemplary embodiment of the present invention.
Figure 7A:
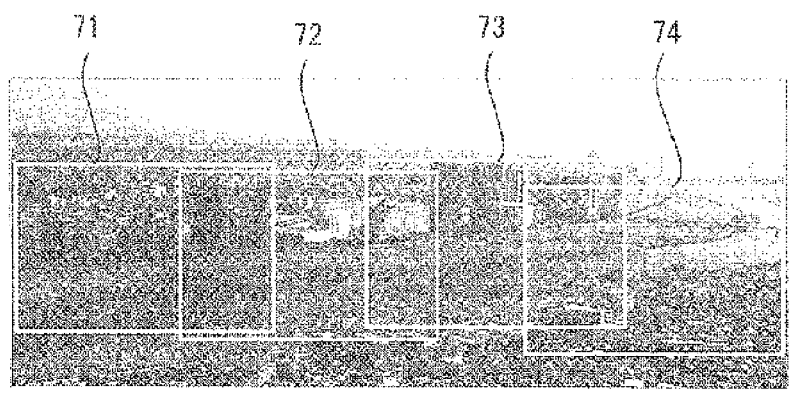
FIG. 7A is a diagram showing an example of panoramic photographing by an imaging apparatus according to a related art.
Figure 7B:
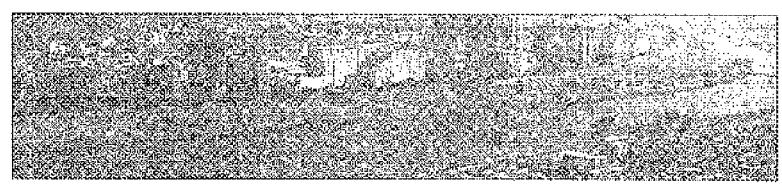
FIG. 7B is a diagram showing an example of a panoramic picture by the imaging apparatus according to the related art.
Figure 7C:
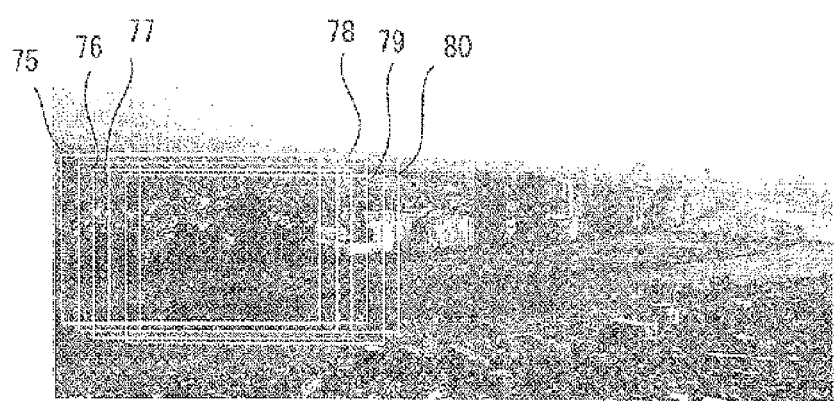
FIG. 7C is a diagram showing an example of panoramic photographing by the imaging apparatus according to the related art.
Figure 7D:
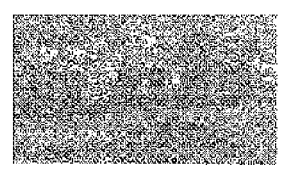
FIG. 7D is a diagram showing an example of a picture with disparities by the imaging apparatus according to the related art.
Figure 7E:
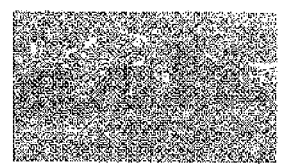
FIG. 7E is a diagram showing an example of a picture with disparities by the imaging apparatus according to the related art.
Figure 8A:
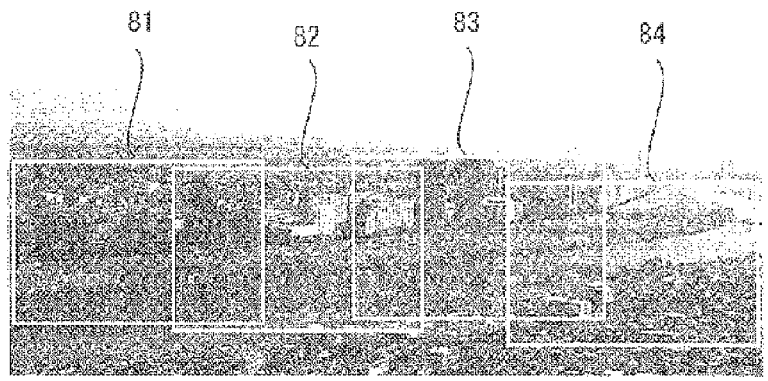
FIG. 8A is a diagram showing an example of panoramic photographing with no camera shake by the imaging apparatus according to the related art.
Figure 8B:
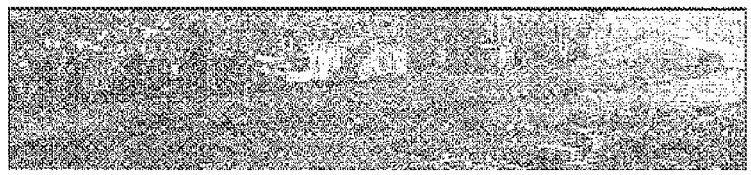
FIG. 8B is a diagram showing an example of a panoramic picture with no camera shake by the imaging apparatus according to the related art.
Figure 8C:
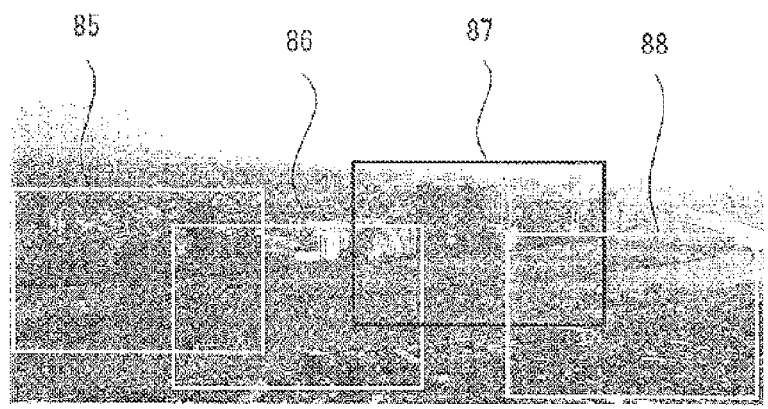
FIG. 8C is a diagram showing an example of panoramic photographing with camera shakes by the imaging apparatus according to the related art.
Figure 8D:
FIG. 8D is a diagram showing an example of a panoramic picture with camera shakes by the imaging apparatus according to the related art.

Next, an operation of the digital camera 1 according to this exemplary embodiment for displaying the guide shown in FIG. 3 is explained using the flowchart of FIG. 6. When the digital camera 1 starts panoramic photography while sliding the digital camera 1 in response to a trigger such as a startup of the digital camera 1 and mode setting (step S61), an image of the subject and basic information such as battery information and the time is displayed on the monitor screen of the digital camera 1 (step S62), and the digital camera 1 continues to wait for photographing to start upon a press of the shutter button (step S63).

In step S62, the guide mark 22 and the aiming mark 23 as the photographing guide are also drawn. In this case, the guide mark is drawn as the fixed point on the monitor screen (on the viewfinder) in a similar manner as the aiming mark and not as the fixed point of an actual subject because the subject to be photographed is not determined yet.

Next, when a press of the shutter button is detected (step S63: Yes), a starting point of a slide range of the digital camera 1 (a first picture when several pictures are photographed in a series) is determined (step S64), and photographing is started (step S65). Note that although the images may be photographed intentionally by a photographer, it is preferable that the digital camera 1 automatically photographs the images.

In the step S65, the photographing guide (the aiming mark 23 and the guide mark 22) are drawn on the image of the subject that is updated real-time on the monitor screen (on the viewfinder). On this screen, the aiming mark 23 is drawn as the fixed point on the monitor screen (on the viewfinder), and the guide mark 22 is drawn as the fixed point of the subject. In order to draw the guide mark 22 as the fixed point of the subject, a technique is required that continues to photograph a feature of the subject and fixes a drawing position of the guide mark 23 using the feature of the subject as a reference point. This technique is an application of the function included in common digital cameras as the face detection AF function and the object recognition AF function, and thus the detailed explanation will not be provided here.

The images photographed by the camera here are stored as temporal data. The latest picture data that is stored and intermediate data (temporal data) of a panoramic picture that has been stitched until then are compared, combined, and the intermediate data of the panoramic picture data is updated (step S66). Next, an evaluation is made whether or not the intermediate data of the panoramic picture has reached a specified size (step S67). When the intermediate data of the panoramic picture has reached the specified size, the process proceeds to the step S68 to end the photographing during the slide. When the intermediate data has not reached the specified size, the process returns to the step S65 in order to obtain a new image. In the step S68, header information is added to store the generated panoramic picture as a file, the generated panoramic picture is stored as an image file, and a series of panoramic photographing is ended.

As explained above, following exemplary advantages are produced by this exemplary embodiment. As a first exemplary advantage, the guide displays that synchronize with each of the subject and the viewfinder provide visual recognition of the shakes when the digital camera 1 slides with respect to the subject. As a second exemplary advantage, the guide displays that synchronize with each of the subject and the viewfinder enable easy correction of the shakes in the digital camera 1. Further, as a third exemplary advantage, the user can easily follow the guide mark as the guide mark is the fixed positioned in the image photographed by the imaging unit that has a length necessary for a stereo or panoramic picture in the moving direction (the slide direction) of the imaging apparatus on the screen.

It is obvious that the present invention is not limited to the above-mentioned exemplary embodiment but various modifications can be made within the scope and sprit of the present invention. For example, as described above, although the basic configuration is that the digital camera 1 horizontally slides to photograph images, similar exemplary advantages can be achieved by drawing a guide line for vertical slide in a similar manner and changing the design of the aiming mark, as a combination of the guide line and the aiming mark.

Moreover, the shape of the guide mark 22 and the aiming mark 23 can be any shape as long as the guide mark 22 and the aiming mark 23 satisfy their roles (the mark to be traced and the mark to trace). For example, the guide mark 22 may be composed of a plurality of lines having the length necessary for the stereo or panoramic picture. For example, the guide mark 22 may be "=" and the aiming mark 23 may be inserted between the two lines. Such a case is further effective for preventing the camera shakes when the gap between the two lines is used as an acceptable shake width. Further, the guide mark may be "+" to provide easier recognition of the central position while the images are photographed during the slide or the guide mark may be configured to provide a guide also in the up-and-down direction. Furthermore, an appropriate guide position in the direction to slide can be marked to enable the user to recognize the width that has already been photographed. For example, three intermediate marks with even intervals therebetween enable the user to recognize the positions of 25%, 50%, and 75%.

Auxiliary information regarding these guide mark 22 and the aiming mark 23 may be displayed in addition. Examples of the auxiliary information are a progress status of photographing during the slide and an alarm for a shake. Another possible example is an amount of stored intermediate data that has been photographed. It is obvious that, in addition to the additional display, these items can be indicated by a change in the shape or color of the guide mark 22 and the aiming mark 23 or by a sound to notify the photographer.

Moreover, the guide mark may be "□" to be used in the photographing during the slide in a wider range in the up-and-down and left-and-right direction, or similarly, the guide mark may have a shape of "o" or "Z" to indicate various directions for the slide thereby to assist the photographing.

Further, the above-mentioned photographing guide generation process can be realized by causing CPU (Central Processing Unit) to execute a computer program. In such a case, the computer program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present application claims priority rights of and is based on Japanese Patent Application No. 2011-074320 filed on Mar. 30, 2011 in the Japanese Patent Office, the entire contents of which are hereby incorporated by reference.

REFERENCE SIGNS LIST

1 DIGITAL CAMERA
11 INFORMATION PROCESSING UNIT
12 IMAGE SENSOR UNIT
13 PROGRAM STORAGE UNIT
14 DATA STORAGE UNIT
15 DISPLAY
16 INPUT UNIT
17 COMMUNICATION FUNCTION UNIT
18 PHOTOGRAPHING GUIDE GENERATING UNIT
22 GUIDE MARK
22*a* MAIN GUIDE MARK
22*b* SUB-GUIDE MARK
23 AIMING MARK

The invention claimed is:

1. A photographing guide displaying method for an imaging apparatus that displays a photographing guide on a display that displays a photographed image when a stereo image or a panoramic image is obtained by an imaging unit, the photographing guide displaying method comprising:
    displaying an aiming mark and a guide mark on the display as the photographing guide, the aiming mark marks a fixed point positioned substantially at a center of the display, and a guide mark being a fixed position in one of the stereo image and the panoramic image obtained by the imaging unit and having a length necessary for the stereo image or the panoramic image in a moving direction of the imaging apparatus on a screen, and
    wherein a left end of the guide mark is not displayed on the display at a start point of photographing when the photographing is performed panning to a left side in a horizontal direction, a right end of the guide mark is not displayed on the display at a start point of photographing when the photographing is performed panning to a right side in the horizontal direction, and the left end or the right end of the guide mark are displayed on the display after the screen panning is completed.

2. The photographing guide displaying method according to claim 1, further comprising:
    notifying a user using the photographing guide of a usage method of the photographing guide, by providing auxiliary information comprising one of a display notification, and a sound.

3. The photographing guide displaying method according to claim 1, further comprising displaying or notifying an amount of stored intermediate data while photographing is performed, as auxiliary information.

4. The photographing guide displaying method according to claim 1, further comprising:
- notifying a user of the auxiliary information regarding a usage method of the photographing guide and/or the amount of stored intermediate data while photographing is performed by changing a shape and/or a color of the photographing guide from the start point of photographing until photographing is completed.

5. A non-transitory computer readable medium storing a program to cause a computer to execute a process of displaying a photographing guide on a display that displays a photographed image when a stereo image or a panoramic image is obtained by an imaging unit, the process comprising:
- displaying an aiming mark and a guide mark on the display as the photographing guide, the aiming mark marks a fixed point positioned substantially at a center of the display, and a guide mark being a fixed position in one of the stereo image and the panoramic image obtained by the imaging unit, and having a length necessary for the stereo image or the panoramic image in a moving direction of an imaging apparatus on a screen, and
- wherein a left end of the guide mark is not displayed on the display at a start point of photographing when the photographing is performed panning to a left side in a horizontal direction, a right end of the guide mark is not displayed on the display at a start point of photographing when the photographing is performed panning to a right side in the horizontal direction, and the left end or the right end of the guide mark are displayed on the display after the screen panning is completed.

* * * * *